United States Patent
Dhanapal et al.

(10) Patent No.: US 10,085,181 B2
(45) Date of Patent: Sep. 25, 2018

(54) MECHANISM TO AVOID PING PONG DURING INTER RADIO ACCESS TECHNOLOGY REDIRECTION FAILURE

(71) Applicant: QUALCOMM Incorporated, San Diego, CA (US)

(72) Inventors: Muthukumaran Dhanapal, San Diego, CA (US); Thawatt Gopal, San Diego, CA (US); Shravan Kumar Raghunathan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 15/195,952

(22) Filed: Jun. 28, 2016

(65) Prior Publication Data

US 2017/0034745 A1 Feb. 2, 2017

Related U.S. Application Data

(60) Provisional application No. 62/198,230, filed on Jul. 29, 2015.

(51) Int. Cl.
*H04W 36/00* (2009.01)
*H04W 76/18* (2018.01)
(Continued)

(52) U.S. Cl.
CPC ....... *H04W 36/0022* (2013.01); *H04W 36/34* (2013.01); *H04W 48/12* (2013.01);
(Continued)

(58) Field of Classification Search
CPC . H04W 36/0022; H04W 76/18; H04W 76/27; H04W 36/34; H04W 72/042; H04W 48/12; H04W 48/08
See application file for complete search history.

(56) References Cited

U.S. PATENT DOCUMENTS 8,509,728 B2 8/2013 Mittal et al.
9,031,563 B2 5/2015 Gupta et al.
(Continued)

FOREIGN PATENT DOCUMENTS

WO 2008094670 A2 8/2008
WO 2010105222 A1 9/2010

OTHER PUBLICATIONS

International Search Report and Written Opinion—PCT/US2016/040069—ISA/EPO—dated Oct. 5, 2016.

*Primary Examiner* — Ajay Cattungal
(74) *Attorney, Agent, or Firm* — Arent Fox, LLP

(57) ABSTRACT

The present disclosure provides a method, apparatus, and computer-readable medium that is able to avoid ping pong mobility when a redirection procedure fails. The apparatus may attempt to perform a redirection procedure from a first RAT to a target frequency of a second RAT. The apparatus may receive a redirection failure notification indicating that the target frequency of the second RAT is unavailable. The apparatus may refrain from initiating a reselection procedure to the target frequency of the second RAT for a predetermined time period. The apparatus may deprioritize the target frequency of the second RAT for the predetermined time period when the target frequency of the second RAT is unavailable and is present in an SIB received from the neighbor cell. The apparatus may generate a list of banned frequencies that includes the target frequency of the second RAT when the target frequency of the second RAT is unavailable.

28 Claims, 8 Drawing Sheets

(51) Int. Cl.
*H04W 76/27* (2018.01)
*H04W 36/34* (2009.01)
*H04W 72/04* (2009.01)
*H04W 48/12* (2009.01)
*H04W 48/08* (2009.01)

(52) U.S. Cl.
CPC ......... *H04W 72/042* (2013.01); *H04W 76/18* (2018.02); *H04W 76/27* (2018.02); *H04W 48/08* (2013.01)

(56) References Cited

U.S. PATENT DOCUMENTS

| | | | |
|---|---|---|---|
| 2013/0165108 A1 | 6/2013 | Xu et al. | |
| 2013/0183981 A1 | 7/2013 | Singh et al. | |
| 2013/0303176 A1* | 11/2013 | Martin | H04W 76/18 455/450 |
| 2014/0120915 A1* | 5/2014 | Wu | H04W 60/04 455/435.3 |
| 2014/0198640 A1* | 7/2014 | Suzuki | H04L 47/76 370/230 |
| 2014/0329529 A1* | 11/2014 | Jung | H04W 36/16 455/436 |
| 2015/0119036 A1 | 4/2015 | Yang et al. | |
| 2015/0223126 A1* | 8/2015 | Jung | H04W 48/20 455/444 |
| 2015/0365856 A1* | 12/2015 | Krishnamoorthy | H04W 76/27 370/331 |
| 2015/0382265 A1 | 12/2015 | Da Silva et al. | |
| 2016/0066218 A1* | 3/2016 | Basavarajappa | H04W 36/0022 370/331 |

\* cited by examiner

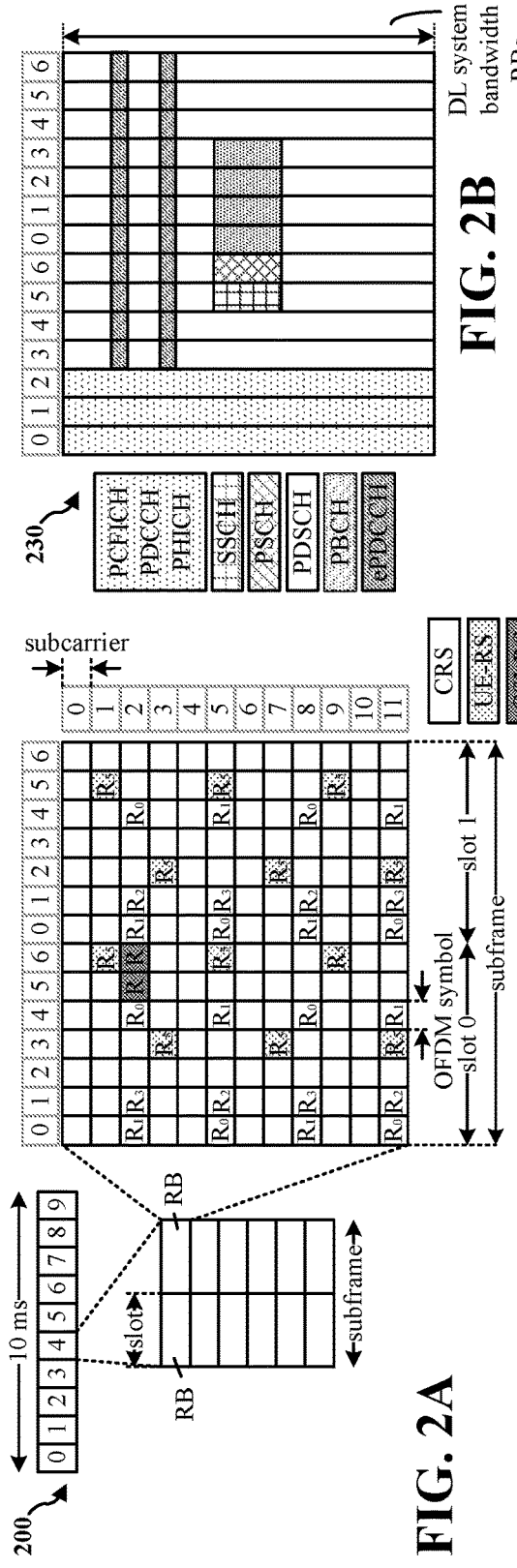
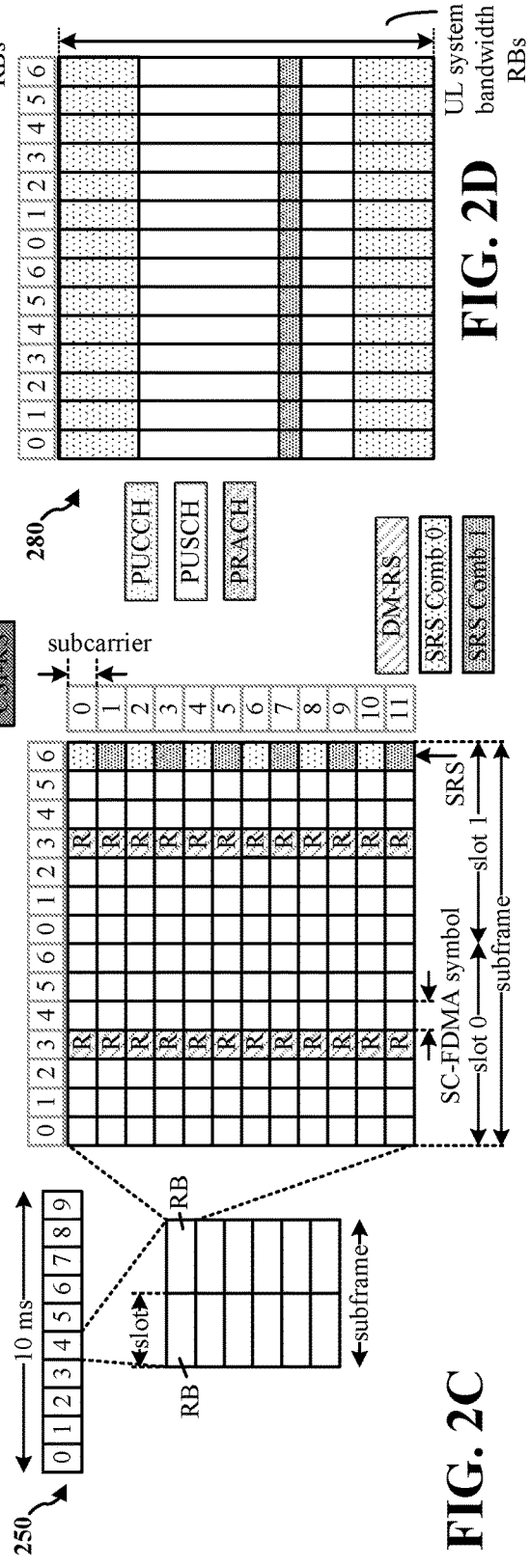
FIG. 2A
FIG. 2B
FIG. 2C
FIG. 2D

MECHANISM TO AVOID PING PONG DURING INTER RADIO ACCESS TECHNOLOGY REDIRECTION FAILURE

CROSS-REFERENCE TO RELATED APPLICATION(S)

This application claims the benefit of U.S. Provisional Application Ser. No. 62/198,230, entitled "MECHANISM TO AVOID PING PONG DURING INTER RADIO ACCESS TECHNOLOGY MOBILITY" and filed on Jul. 29, 2015, which is expressly incorporated by reference herein in its entirety.

BACKGROUND

Field

The present disclosure relates generally to communication systems, and more particularly, to mechanism for avoiding mobility ping pong between a source radio access technology (RAT) and a target RAT during a redirection procedure.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

During source-to-target inter-radio access technology (IRAT) redirection, if a user equipment (UE) that is camped on a source RAT is unable to camp on a target frequency of a target RAT (e.g., due to the target frequency of the target RAT being barred or a forbidden timing advance (TA)), the UE may later attempt to reselect or redirect to the same target frequency of the target RAT. The UE may attempt to reselect (in idle mode) or redirect (in connected mode) to the same target frequency of the target RAT because the UE and/or the network may be unaware of the reason for the source-to-target IRAT redirection failure. The redirection failure may lead to a mobility ping pong between the source RAT and the target RAT that causes a negative user experience. There is a need able to enable a UE to avoid ping pong mobility when a redirection procedure from a source RAT to a target RAT fails.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

During source-to-target IRAT redirection, if a UE that is camped on a source RAT is unable to camp on the target frequency of a target RAT (e.g., due to the target frequency of the target RAT being barred or a forbidden TA), the UE may again attempt to reselect (in idle mode) or redirect (in connected mode) to the same target frequency of the target RAT. The UE may attempt to reselect or redirect to the same target frequency of the target RAT because the UE and/or the network may be unaware of the reason for the source-to-target IRAT redirection failure. The redirection failure may lead to a mobility ping pong between the source RAT and the target RAT that causes a negative user experience.

The UE may be unaware of the reason for the redirection failure because the source radio resource control (RRC) layer 3 (L3 layer) at the UE may receive a source-to-target redirection failure response without the reason for redirection failure. Therefore, since the source RRC L3 layer at the UE is not aware of the reason for the redirection failure, the source RRC L3 layer of the UE might trigger a source-to-target idle mode reselection on the same frequency that leads to an undesirable ping pong between the source RAT and the target RAT.

For example, the source-to-target redirection procedure at the UE may fail when the target frequency of the target RAT is barred or due to a forbidden TA. When the redirection procedure fails, the UE may attempt frequency reselection to other frequencies of the target RAT based on measurements obtained by the UE that are related to the target RAT. For example, the measurements may be based on information received in a system information block (SIB) (e.g., SIB2, SIB3, SIB4, SIB5, SIB6, SIB7, or SIB8 depending on the target RAT) or stored in an acquisition database (ACQ DB) that includes a list of frequencies and/or RATs that have been previously acquired by the UE.

When redirection attempts on these frequencies also fail, the base station of the target RAT may send a source-to-target redirection failure notification to the source RRC L3 layer of the UE and/or target RRC L3 layer of the UE without specifying the reason for redirection failure. The UE source RRC L3 layer may enter an RRC_IDLE state when the redirection failure notification is received. Since the UE does not know the reason(s) for the failure of the redirection, the source physical layer (e.g., ML1) of the UE may trigger a source-to-target reselection procedure to reselect to the barred target frequency of the target RAT. Because the target frequency of the target RAT is barred, the source-to-target reselection procedure may also fail. Furthermore, the UE may receive another redirection request from the network to initiate a source-to-target redirection to the target frequency of the target RAT. Again a source-to-target redirection failure may occur and result in a mobility ping pong between the source RAT and the target RAT causing an undesirable user experience.

In a first aspect, the present disclosure provides a solution by enabling the UE to create a frequency blacklist that includes the barred target frequencies received in the redirection failure notification and to refrain from reselecting to the barred target frequencies in the blacklist for a predetermined amount of time. In a second aspect, the present disclosure provides a solution by enabling the UE to deprioritize any of the barred frequencies that are also present in an SIB for a predetermined amount of time and to refrain from reselecting from the deprioritized frequencies.

By providing a mechanism to avoid ping pong mobility, a UE of the present disclosure may be able to conserve power during both connected and idle states by avoiding searching/measuring frequencies that are barred or forbidden. In addition, the UE may have an increased probability of finding service on a target RAT when the source RAT is congested.

In an aspect of the disclosure, a method, a computer-readable medium, and an apparatus are provided. The apparatus may attempt to perform a redirection procedure from a first RAT to a target frequency of a second RAT. The apparatus may receive a redirection failure notification that indicates that the target frequency of the second RAT is unavailable. The apparatus may refrain from initiating a reselection procedure to the target frequency of the second RAT for a predetermined time period after receiving the redirection failure notification. The apparatus may deprioritize the target frequency of the second RAT for the predetermined time period when the target frequency of the second RAT is indicated as unavailable and is present is in a SIB received from the neighbor cell.

In another aspect, the apparatus may attempt to perform a redirection procedure from a first RAT to a target frequency of a second RAT. The apparatus may receive a redirection failure notification that indicates that the target frequency of the second RAT is unavailable. The apparatus may refrain from initiating a reselection procedure to the target frequency of the second RAT for a predetermined time period after receiving the redirection failure notification. The apparatus may generate a list of one or more banned frequencies that includes the target frequency of the second RAT when the target frequency of the second RAT is indicated as unavailable.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
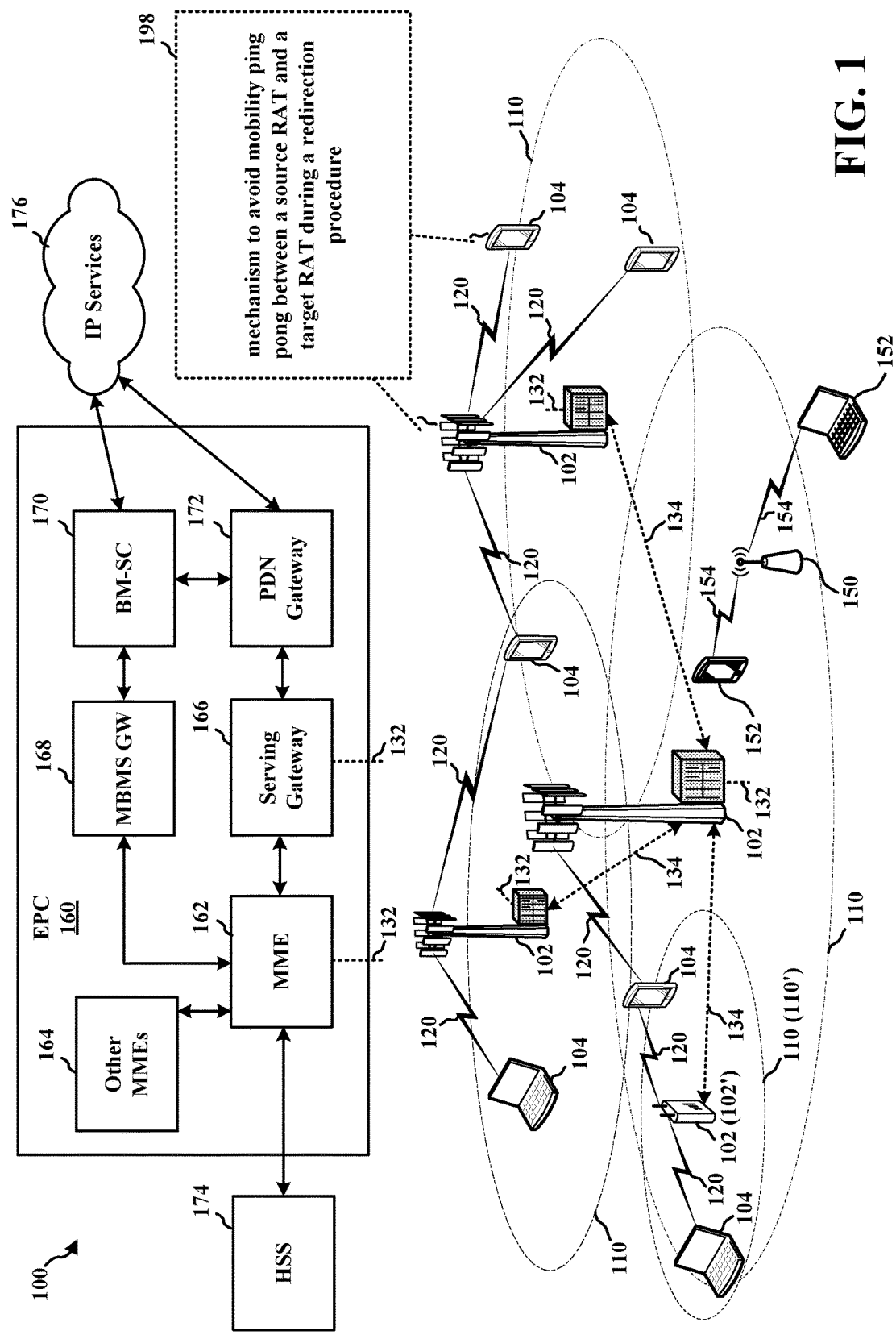
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to avoid mobility ping pong between a source RAT and a target RAT during a redirection procedure (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
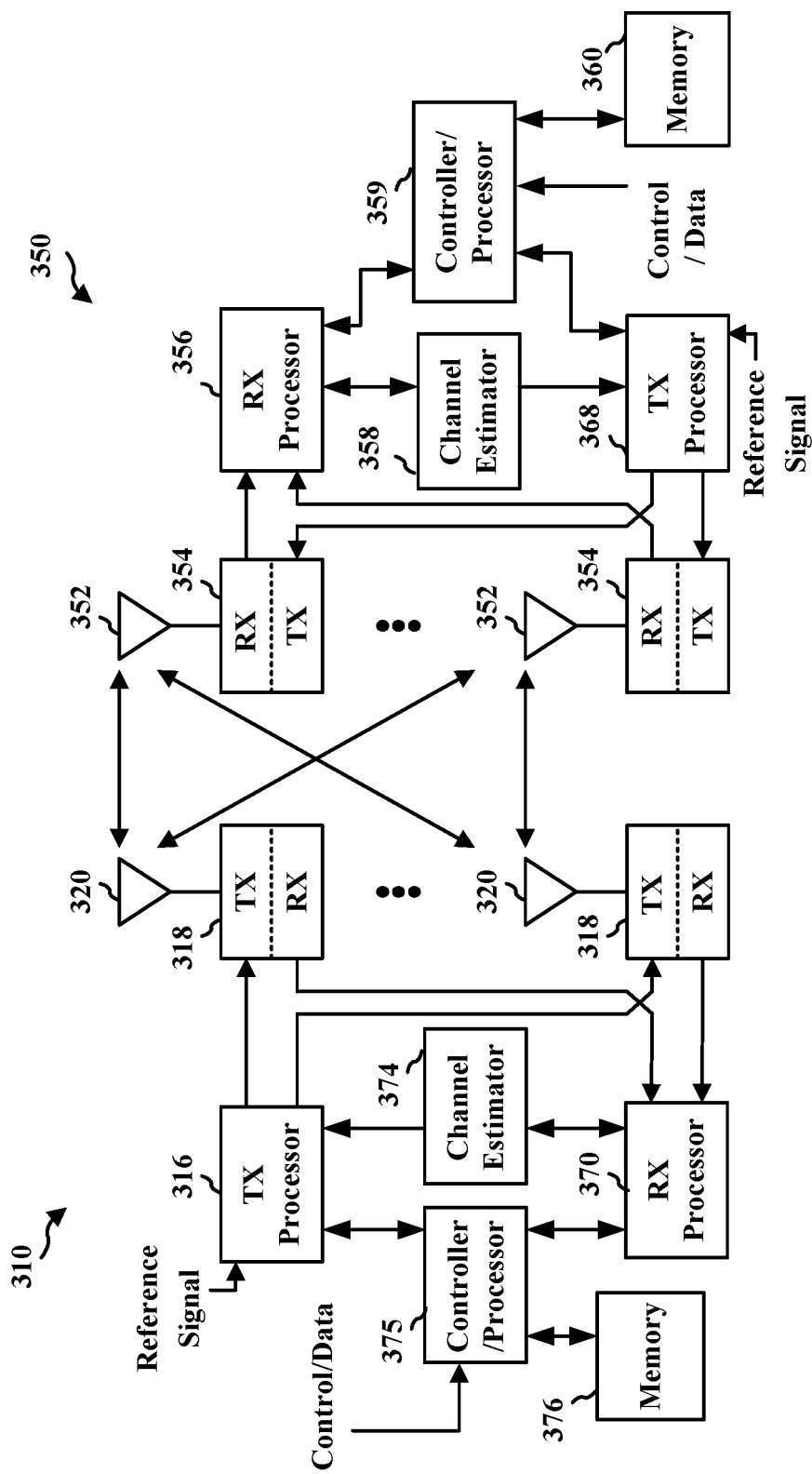
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC)

coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

During source-to-target IRAT redirection, if a UE that is camped on a source RAT is unable to camp on the target frequency of a target RAT (e.g., due to the target frequency of the target RAT being barred or a forbidden TA), the UE may later attempt to reselect (in idle mode) or redirect (in connected mode) to the same target frequency of the target RAT. The UE may attempt to reselect or redirect to the same target frequency of the target RAT because the UE and/or the network may be unaware of the reason for the source-to-target IRAT redirection failure. The redirection failure may lead to a mobility ping pong between the source RAT and the target RAT that causes a negative user experience.

The UE may be unaware of the reason for the redirection failure because the source radio resource control (RRC) layer 3 (L3 layer) at the UE may receive a source-to-target redirection failure response without the reason for redirection failure. Therefore, since the source RRC L3 layer at the UE is not aware of the reason for the redirection failure, the source RRC L3 layer of the UE might trigger a source-to-target idle mode reselection on the same frequency that leads to an undesirable ping pong between the source RAT and the target RAT.

For example, the source-to-target redirection procedure at the UE may fail when the target frequency of the target RAT is barred or due to a forbidden TA. When the redirection procedure fails, the UE may attempt frequency reselection to other frequencies of the target RAT based on measurements obtained by the UE that are related to the target RAT. For example, the measurements may be based on information received in a system information block (SIB) (e.g., SIB2, SIB3, SIB4, SIB5, SIB6, SIB7, or SIB8 depending on the target RAT) or stored in an acquisition database (ACQ DB) that includes a list of frequencies and/or RATs that have been previously acquired by the UE.

When redirection attempts on these frequencies also fail, the base station of the target RAT may send a source-to-target redirection failure notification to the source RRC L3 layer of the UE and/or target RRC L3 layer of the UE without specifying the reason for redirection failure. The UE source RRC L3 layer may enter an RRC_IDLE state when the redirection failure notification is received. Since the UE does not know the reason(s) for the failure of the redirection, the source physical layer (e.g., ML1) of the UE may trigger a source-to-target reselection procedure to reselect to the barred target frequency of the target RAT. Because the target frequency of the target RAT is barred, the source-to-target reselection procedure may also fail. Furthermore, the UE may receive another redirection request from the network to initiate a source-to-target redirection to the target frequency of the target RAT. Again a source-to-target redirection failure may occur and result in a mobility ping pong between the source RAT and the target RAT causing an undesirable user experience.

In a first aspect, the present disclosure provides a solution by enabling the UE to create a frequency blacklist that includes the barred target frequencies received in the redirection failure notification and to refrain from reselecting to the barred target frequencies in the blacklist for a predetermined amount of time. In a second aspect, the present disclosure provides a solution by enabling the UE to deprioritize any of the barred frequencies that are also present in an SIB for a predetermined amount of time and to refrain from reselecting from the deprioritized frequencies.

By providing a mechanism to avoid ping pong mobility, a UE of the present disclosure may be able to conserve power during both connected and idle states by avoiding searching/measuring frequencies that are barred or forbidden. In addition, the UE may have an increased probability of finding service on a target RAT when the source RAT is congested.

Figure 4:
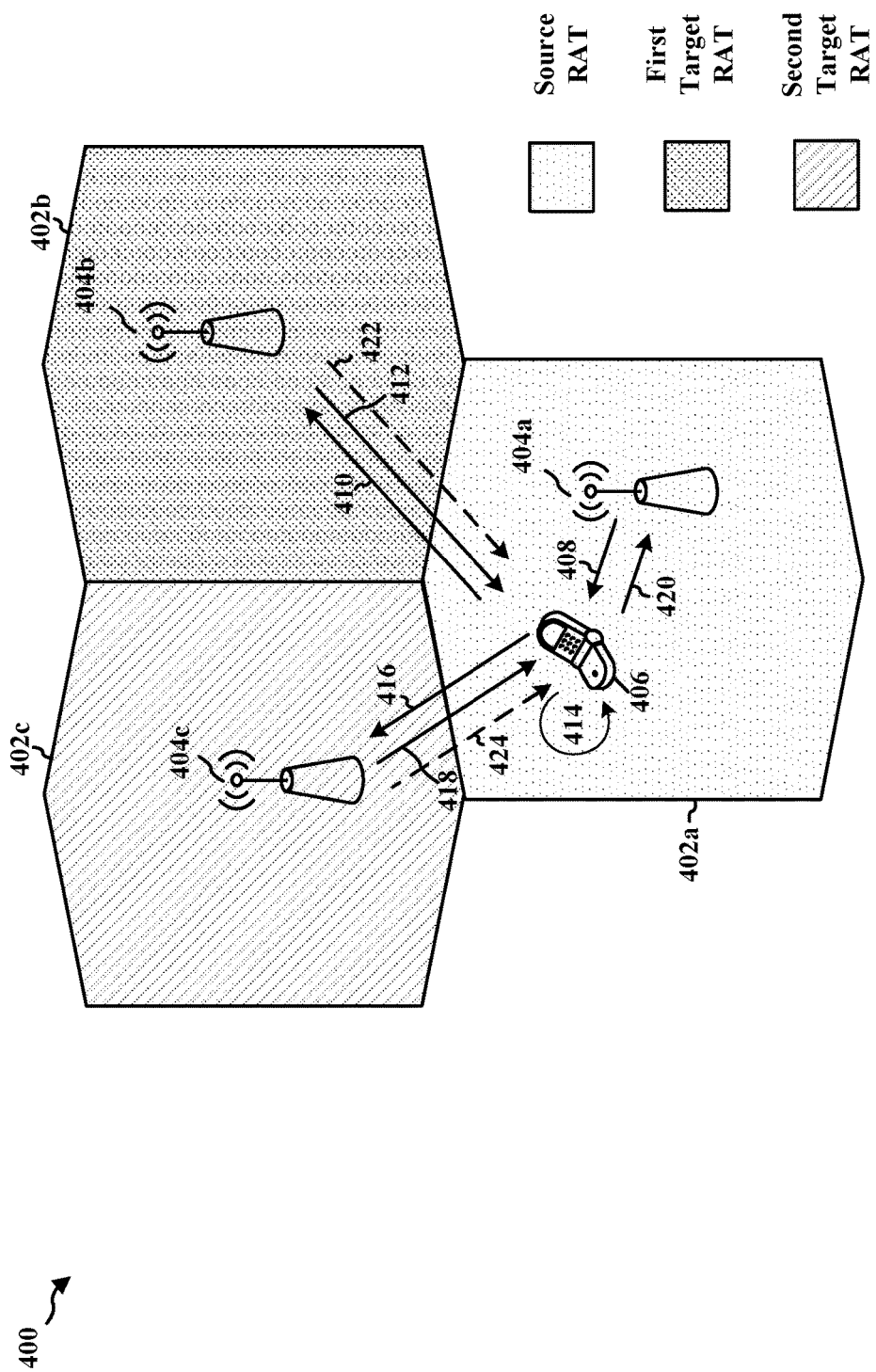
FIG. 4 is a diagram of an exemplary wireless communications system in accordance with one aspect of the present disclosure device-to-device communications system.

FIG. 4 is a diagram of an exemplary wireless communications system 400 in accordance with one aspect of the present disclosure. In an aspect, the wireless communication system 400 includes a serving cell 402a that is the region served by a serving base station 404a. A source RAT may be employed by serving base station 404a for communication with UEs served by serving cell 402a. For example, the source RAT may include W-CDMA, TD-SCDMA, global systems for mobile communications (GSM) employing TDMA, E-UTRA, Wi-Fi, WiMAX, IEEE 802.20, Flash-OFDM employing OFDMA, 2G, 3G, or LTE.

In addition, the wireless communications system 400 includes a first neighbor cell 402b that is the region served by first neighbor base station 404b. A first target RAT may be employed by first neighbor base station 404b for communication with UEs served by the first neighbor cell 402b. For example, the first target RAT may include W-CDMA, TD-SCDMA, GSM employing TDMA, E-UTRA, Wi-Fi, WiMAX, IEEE 802.20, Flash-OFDM employing OFDMA, 2G, 3G, or LTE.

Further, the wireless communications system 400 may include a second neighbor cell 402c is the region served by the second neighbor base station 404c. A second target RAT may be employed by the second neighbor base station 404c for communication with UEs served by second neighbor cell 402c. For example, the first target RAT may include W-CDMA, TD-SCDMA, GSM employing TDMA, E-UTRA, Wi-Fi, WiMAX, IEEE 802.20, Flash-OFDM employing OFDMA, 2G, 3G, or LTE.

In an aspect, a UE 406 located in serving cell 402a may initiate a redirection procedure 410 to a target frequency of the first target RAT employed by the first neighbor base station 404b when a redirection request 408 is received at the UE 406. For example, the redirection request 408 may instruct the UE 406 to redirect 410 from the source RAT to a target frequency of the first target RAT employed by the first neighbor base station 404b. In an aspect, the redirection request 408 may be transmitted by the serving base station 404a as illustrated in FIG. 4. However, alternatively, the redirection request 408 may be transmitted by the first neighbor base station 404b or the second neighbor base station 404c.

When the redirection procedure 410 from the source RAT to the first target RAT fails, the first neighbor base station 404b may send a redirection failure notification 412 to the UE 406. For example, the redirection failure notification 412 may be received by the source RRC L3 layer and/or the target RRC L3 layer of the UE 406. In an aspect, the redirection failure notification 412 may include a list of target frequencies of the first RAT that are barred for selection. After receiving the redirection failure notification 412, the UE 406 may enter 414 an RRC_IDLE state. The UE 406 may receive cell reselection information 422, 424 from each of the first neighbor cell 402b and the second neighbor cell 402c. For example, the cell reselection information 422, 424 may be a SIB that contains information relevant to IRAT cell reselection frequencies. The UE 406 may determine 414 if any of the barred target frequencies received in the redirection failure notification 412 are also included in the SIB 422 received from the first neighbor base station 404b.

The UE 406 may deprioritize any of the barred frequencies that are also present in the SIB 422 for a predetermined amount of time (e.g., 30 sec, 1 min, 5 min, 10 min) and refrain from reselecting from the deprioritized frequencies. In aspect, the predetermined amount of time that the barred frequencies are deprioritized may be configurable by the UE 406 and/or the network. By deprioritizing the barred frequencies also present in the SIB 422, the UE 406 may rely on these frequencies as a last resort for reselection to the first target RAT used by the first neighbor base station 404b. For example, the UE 406 may deprioritize the barred frequencies that are also present in the SIB 422 by setting a value associated with the barred frequencies to a predetermined value (e.g., −1) in a list of cell reselection priority frequencies. By deprioritizing the barred frequencies also present in the SIB 422, the UE 406 may attempt 414 to initiate a reselection procedure 410, 416 for non-barred frequencies. For example, the non-barred frequencies may be frequencies for the first target RAT (e.g., the first neighbor cell 402b) or the second target RAT (e.g., the second neighbor cell 402c). If, for example, all frequencies of the first target RAT are deprioritized (e.g., due to congestion of the first target RAT), then the UE 406 may initiate a reselection procedure 416 of one or more frequencies of the second target RAT.

Alternatively, if the UE 406 determines 414 that none of the barred target frequencies are also present in the SIB 422 received from the first target RAT, then the UE 406 may create 414 a frequency blacklist that includes the barred target frequencies received in the redirection failure notification 412. In an aspect, the blacklist frequencies may be valid for a predetermined amount of time (e.g., 30 sec, 1 min, 5 min, 10 min) that is configurable by the UE 406 and/or the network.

In a first exemplary embodiment, the UE 406 may determine 414 if any new target frequencies in the new redirection request 408 are included in the blacklist frequencies. If any of the new target frequencies in the new redirection request 408 are included in the blacklist frequencies, the UE 406 may refrain from initiating a new redirection procedure for the frequencies included in the blacklist. Instead, the UE 406 may attempt to redirect to a frequency of the first target RAT that is not included in the frequency blacklist. In an aspect, the UE 406 may also avoid performing connected mode measurements of the blacklist frequencies of the first target RAT to conserve power at the UE 406.

If all of the redirection frequencies for the first target RAT included in the redirection request 408 are also in the frequency blacklist, the UE 406 may initiate a redirection procedure 416 to a target frequency of a second target RAT. If the redirection procedure 416 to the target frequency of the second target RAT also fails, the second neighbor base station 404c may send a redirection failure notification 418 including the barred frequencies of the second target RAT to the UE 406.

In a second exemplary embodiment, the UE 406 may send 420 information related to the frequency blacklist to the serving base station 404a, and the serving base station 404a may use the information related to the frequency blacklist to avoid sending a redirection request 408 that includes one of the blacklisted frequencies of the first target RAT to the UE 406.

In this way, the exemplary wireless communications system 400 of the present disclosure may be able to provide a more desirable user experience by avoiding ping pong mobility when a redirection procedure from a source RAT to a target RAT fails. In addition, the wireless communications system 400 of the present disclosure may be able to conserve power at the UE (e.g., during both connected and idle states) by avoiding searching/measuring frequencies that are barred or forbidden. Furthermore, the aspects of the present disclosure may increase the probability that the UE finds service on a target RAT when the source RAT is congested.

Figure 5A:
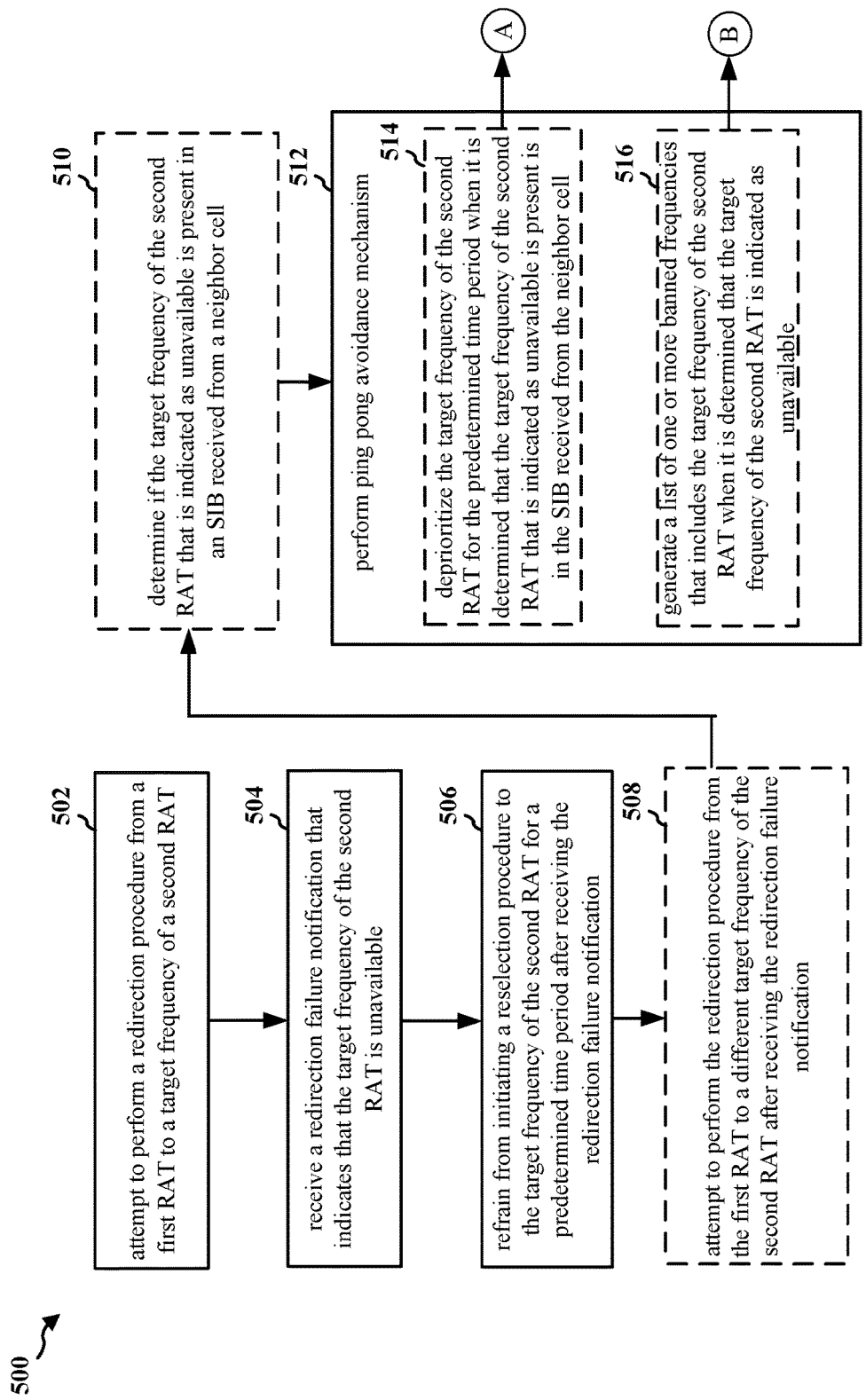
FIGS. 5A and 5B are a flowchart of a method of wireless communication.
Figure 5B:
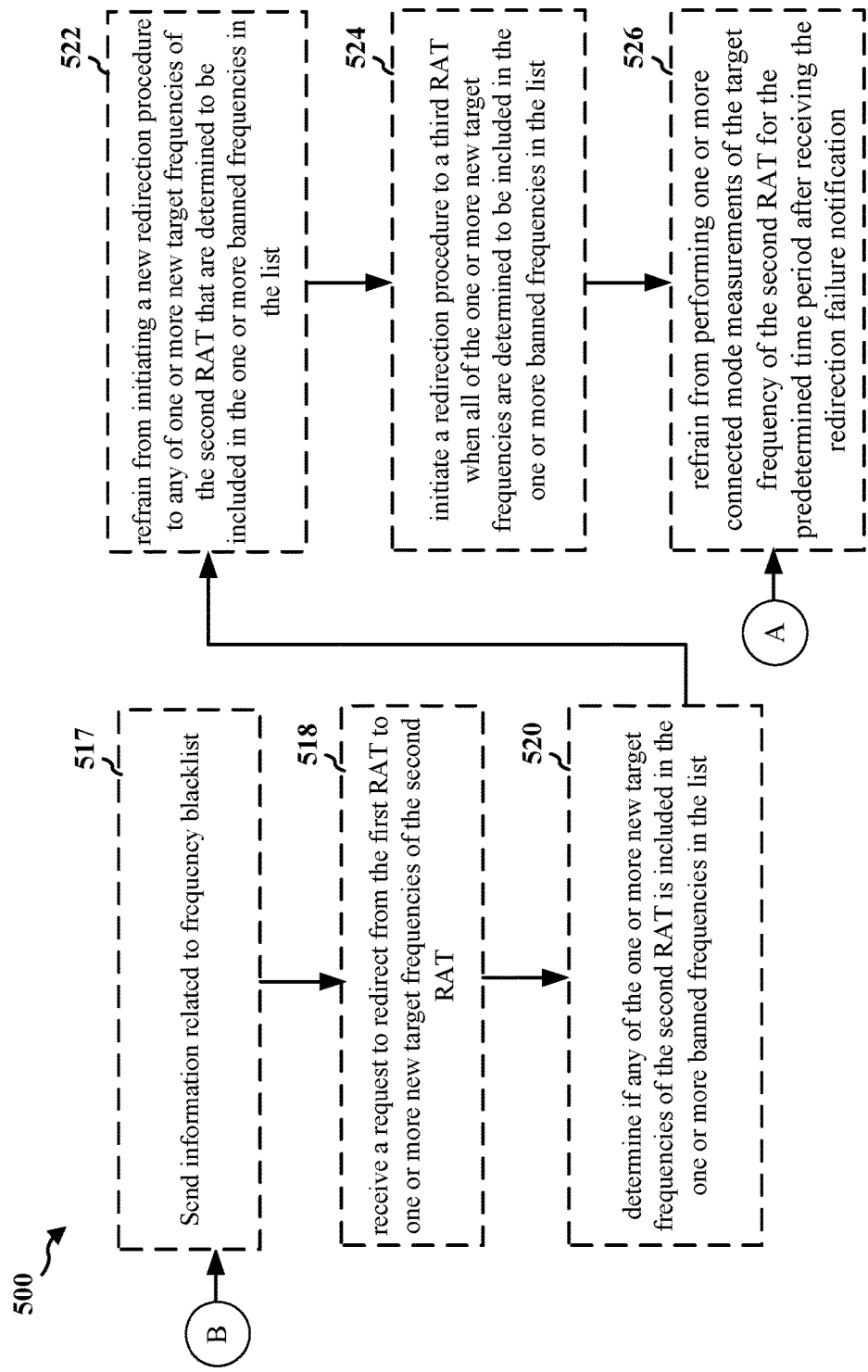

FIGS. 5A and 5B are a flowchart 500 of a method of wireless communication. The method may be performed by a UE (e.g., the UE 406, the apparatus 602/602').

As seen in FIG. 5A, at 502, the UE may attempt to perform a redirection procedure from a first RAT to a target frequency of a second RAT. For example, referring to FIG. 4, upon receipt of a redirection request 408, the UE 406 located in serving cell 402a may initiate a redirection procedure 410 to a target frequency of the first target RAT employed by the first neighbor base station 404b. For example, the redirection request 408 may instruct the UE 406 to redirect 410 from the source RAT to a target frequency of the first target RAT employed by the first neighbor base station 404b. In an aspect, the redirection request 408 may be transmitted by the serving base station 404a as illustrated in FIG. 4. However, alternatively, the redirection request 408 may be transmitted by the first neighbor base station 404b or the second neighbor base station 404c. In a first aspect, the first RAT may be W-CDMA, TD-SCDMA, GSM employing TDMA, E-UTRA, Wi-Fi, WiMAX, IEEE 802.20, Flash-OFDM employing OFDMA, 2G, 3G, or LTE. In a further aspect, the second RAT may be W-CDMA, TD-SCDMA, GSM employing TDMA, E-UTRA, Wi-Fi, WiMAX, IEEE 802.20, Flash-OFDM employing OFDMA, 2G, 3G, or LTE.

At 504, the UE may receive a redirection failure notification that indicates that the target frequency of the second RAT is unavailable. For example, referring to FIG. 4, when the redirection procedure 410 from the source RAT to the first target RAT fails, the first neighbor base station 404b may send a redirection failure notification 412 to the UE 406. For example, the redirection failure notification 412 may be received by the source RRC L3 layer and/or the target RRC L3 layer of the UE 406. In an aspect, the redirection failure notification 412 may include a list of target frequencies of the first RAT that are barred for selection.

At 506, the UE may refrain from initiating a reselection procedure to the target frequency of the second RAT for a predetermined time period after receiving the redirection failure notification. For example, referring to FIG. 4, the UE 406 may receive cell reselection information 422, 424 from each of the first neighbor cell 402b and the second neighbor cell 402c. For example, the cell reselection information 422, 424 may be a SIB that contains information relevant to IRAT cell reselection frequencies. The UE 406 may determine 414 if any of the barred target frequencies received in the redirection failure notification 412 are also included in the SIB 422 received from the first neighbor base station 404b. The UE 406 may deprioritize any of the barred frequencies that are also present in the SIB 422 for a predetermined amount of time (e.g., 30 sec, 1 min, 5 min, 10 min) and refrain from reselecting from the deprioritized frequencies. In aspect, the predetermined amount of time that the barred frequencies are deprioritized may be configurable by the UE 406 and/or the network. By deprioritizing the barred frequencies also present in the SIB 422, the UE 406 may rely on these frequencies as a last resort for reselection to the first target RAT used by the first neighbor base station 404b. For example, the UE 406 may deprioritize the barred frequencies also present in the SIB 422, by setting a value associated with these barred frequencies to a predetermined value (e.g., −1) in a list of cell reselection priority frequencies.

At 508, the UE may attempt to perform the redirection procedure from the first RAT to a different target frequency of the second RAT after receiving the redirection failure notification. For example, referring to FIG. 4, by deprioritizing the barred frequencies also present in the SIB 422, the UE 406 may attempt 414 to initiate a reselection procedure 410, 416 for other non-barred frequencies. For example, the other non-barred frequencies may be frequencies the first target RAT (e.g., the first neighbor cell 402b) or the second target RAT (e.g., the second neighbor cell 402c). If, for example, all frequencies of the first target RAT are deprioritized (e.g., due to congestion of the first target RAT), then the UE 406 may initiate a reselection procedure 416 of one or more frequencies of the second target RAT.

At 510, the UE may determine if the target frequency of the second RAT that is indicated as unavailable is present in an SIB received from a neighbor cell. For example, referring to FIG. 4, the UE 406 may receive cell reselection information 422, 424 from each of the first neighbor cell 402b and the second neighbor cell 402c. For example, the cell reselection information 422, 424 may be a SIB that contains information relevant to IRAT cell reselection frequencies. The UE 406 may determine 414 if any of the barred target frequencies received in the redirection failure notification 412 are also included in the SIB 422 received from the first neighbor base station 404b.

At 512, the UE may perform a ping pong avoidance mechanism. For example, referring to FIG. 4, the wireless communications system 400 of the present disclosure may be able to provide a more desirable user experience by avoiding ping pong mobility when a redirection procedure from a source RAT to a target RAT fails.

At 514, the UE may perform the ping pong avoidance mechanism by deprioritizing the target frequency of the second RAT for the predetermined time period when it is determined that the target frequency of the second RAT that is indicated as unavailable is present is in the SIB received from the neighbor cell. For example, referring to FIG. 4, the UE 406 may deprioritize any of the barred frequencies that are also present in the SIB 422 for a predetermined amount of time (e.g., 30 sec, 1 min, 5 min, 10 min) and refrain from reselecting from the deprioritized frequencies. In aspect, the predetermined amount of time that the barred frequencies are deprioritized may be configurable by the UE 406 and/or the network. By deprioritizing the barred frequencies also present in the SIB 422, the UE 406 may rely on these frequencies as a last resort for reselection to the first target RAT used by the first neighbor base station 404b. For example, the UE 406 may deprioritize the barred frequencies also present in the SIB 422, by setting a value associated with these barred frequencies to a predetermined value (e.g., −1) in a list of cell reselection priority frequencies.

If the UE performs the ping pong avoidance mechanism by deprioritizing the target frequency of the second RAT for the predetermined time period, then as seen in FIG. 5B, at 526, the UE may refrain from performing one or more connected mode measurements of the target frequency of the second RAT for the predetermined time period after receiving the redirection failure notification. For example, referring to FIG. 4, the UE 406 may also avoid performing connected mode measurements of the blacklist frequencies of the first target RAT, which may conserve power at the UE 406.

Additionally and/or alternatively, at 516, the UE may perform the ping pong avoidance mechanism by generating a list of one or more banned frequencies that includes the target frequency of the second RAT when it is determined that the target frequency of the second RAT is indicated as unavailable. For example, referring to FIG. 4, if necessary, if the UE 406 determines 414 that none of the barred target frequencies are also present in the SIB 422 received from the first target RAT, then the UE 406 may create 414 a frequency blacklist that includes the barred target frequencies received in the redirection failure notification 412. In an aspect, the blacklist frequencies may be valid for a predetermined amount of time (e.g., 30 sec, 1 min, 5 min, 10 min) that is configurable by the UE 406 and/or the network.

As in FIG. 5B, at 517, the UE may send information related to the frequency blacklist to the base station. This information may assist the base station to avoid sending a redirect to a frequency on the blacklist.

As seen in FIG. 5B, at 518, the UE may receive a request to redirect from the first RAT to one or more new target frequencies of the second RAT. For example, referring to FIG. 4, the blacklist frequencies of the first target RAT may be avoided by the UE 406 if another redirection request 408 is received that includes one of the blacklist frequencies of the first target RAT (e.g., from the serving base station 404a).

At 520, the UE may determine if any of the one or more new target frequencies of the second RAT is included in the one or more banned frequencies in the list. For example, referring to FIG. 4, the UE 406 may determine 414 if any new target frequencies in the new redirection request 408 are included in the blacklist frequencies.

At 522, the UE may refrain from initiating a new redirection procedure to any of one or more new target frequencies of the second RAT that are determined to be included in the one or more banned frequencies in the list. For example, referring to FIG. 4, if any of the new target frequencies in the new redirection request 408 are included in the blacklist frequencies, the UE 406 may refrain from initiating a new redirection procedure with respect to these frequencies included in the blacklist. Instead, the UE 406 may attempt to redirect to a frequency of the first target RAT that is not included in the frequency blacklist.

At 524, the UE may initiate a redirection procedure to a third RAT when all of the one or more new target frequencies are determined to be included in the one or more banned frequencies in the list. For example, referring to FIG. 4, if all the redirection frequencies for the first target RAT included in the redirection request 408 are also in the frequency blacklist, then the UE 406 may initiate a redirection procedure 416 to a target frequency of a second target RAT. In an aspect, the third RAT may be W-CDMA, TD-SCDMA, GSM employing TDMA, E-UTRA, Wi-Fi, WiMAX, IEEE 802.20, Flash-OFDM employing OFDMA, 2G, 3G, or LTE At 526, the UE may refrain from performing one or more connected mode measurements of the target frequency of the second RAT for the predetermined time period after receiving the redirection failure notification. For example, referring to FIG. 4, the UE 406 may also avoid performing connected mode measurements of the blacklist frequencies of the first target RAT, which may conserve power at the UE 406.

Figure 6:
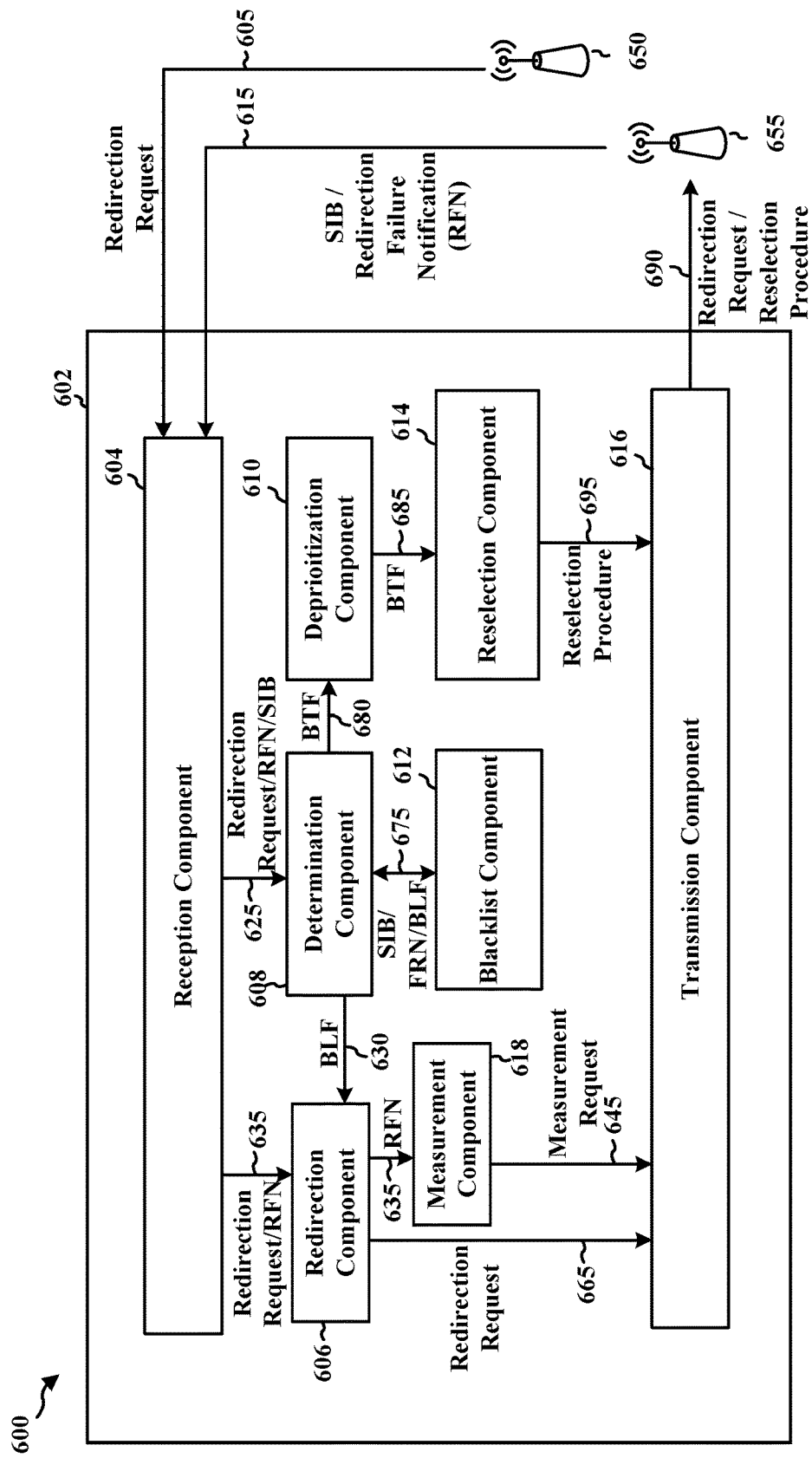
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus may be a UE. The apparatus may include a reception component 604, a redirection component 606, a determination component 608, a deprioritization component 610, a blacklist component 612, a reselection component 614, a transmission component 616, and a measurement component 618.

At reception component 604, the UE may receive signaling 605 related to a redirection request from a serving base station 650. For example, the redirection request may be for redirection from a first RAT to a target frequency of a second RAT. Signaling 635 associated with the redirection request may be sent from the reception component 604 to the redirection component 606.

At redirection component 606, the UE may attempt to perform a redirection procedure from a first RAT to a target frequency of a second RAT by sending signaling 665 related to the redirection request to the transmission component 616.

At transmission component 616, signaling 690 related to the redirection request for redirection to the target frequency of the second RAT may be sent to the neighbor base station 655 employing the second RAT.

At reception component 604, the UE may receive signaling 615 associated with a redirection failure notification (RFN) from the neighbor base station 655 that indicates that the target frequency of the second RAT that is unavailable. For example, the signaling related to redirection failure notification may be received by the source RRC L3 layer and/or the target RRC L3 layer of the UE. In an aspect, the signaling 615 related to the redirection failure notification may include a list of target frequencies of the first RAT that are barred for selection.

At reception component 604, the UE may receive signaling 615 associated with an SIB including information related to reselection procedures for the neighbor base station 655. The reception component 604 may send signaling 625 related to the SIB and/or the redirection failure notification to the determination component 608.

At determination component 608, the UE may determine if the target frequency of the second RAT that is indicated as unavailable is present in an SIB received from a neighbor base station 655. For example, the determination component 608 may determine if any of the barred target frequencies received in the redirection failure notification are also included in the SIB received from the neighbor base station 655. The determination component 608 may send signaling 680 related to the barred target frequencies (BTF) to the deprioritization component 610.

At deprioritization component 610, the UE may deprioritize the target frequency of the second RAT for the predetermined time period when it is determined that the target frequency of the second RAT that is indicated as unavailable is present is in the SIB received from the neighbor cell. For example, the UE 406 may deprioritize any of the barred frequencies that are also present in the SIB for a predetermined amount of time (e.g., 30 sec, 1 min, 5 min, 10 min) and send signaling relating to the barred frequencies to the reselection component 614. For example, at the deprioritization component 610, the UE may deprioritize the barred frequencies also present in the SIB, by setting a value associated with these barred frequencies to −1 in a list of cell reselection priority frequencies. The deprioritization component 610 may send signaling 685 associated with the BTF to the reselection component 614.

At the reselection component 614, the UE may refrain from initiating a reselection procedure to the target frequency of the second RAT for a predetermined time period after receiving the redirection failure notification. By deprioritizing the barred frequencies also present in the SIB, the UE may rely, at the reselection component 14, on the barred frequencies as a last resort for reselection to the first target RAT used by the neighbor base station 655. The reselection component 614 may send signaling 695 associated with a reselection procedure to the transmission component 616.

At redirection component 606, the UE may attempt to perform the redirection procedure from the first RAT to a different target frequency of the second RAT after receiving signaling 635 related to the redirection failure notification from the reception component 604.

At blacklist component 612, signaling 675 associated with a list of blacklist frequencies BLF. The blacklist component 612 may generate a list of one or more banned frequencies (e.g., BLF) that includes the target frequency of the second RAT when it is determined (e.g., at the determination component 608) that the target frequency of the second RAT is indicated as unavailable. For example, if the UE determines (e.g., at the determination component 608) that none of the barred target frequencies are also present in the SIB received from the first target RAT, then the blacklist component 612 may create a frequency blacklist that includes the barred target frequencies received in the redirection failure notification when signaling related to the SIB/RFN is received at the blacklist component 612. In an aspect, the blacklist frequencies may be valid for a predetermined amount of time (e.g., 30 sec, 1 min, 5 min, 10 min) and signaled to the determination component 608.

At the reception component 604, the UE may receive a request 605 to redirect from the first RAT to one or more new target frequencies of the second RAT from the serving base station 650. The reception component 604 may send signaling 625 related to the request to redirect to one or more new target frequencies of the second RAT to the determination component 608.

At determination component 608, the UE may determine if any of the one or more new target frequencies of the second RAT is included in the one or more banned frequencies in the list. For example, at the determination component 608, the UE may determine if any new target frequencies in the new redirection request are included in the BLF. The determination component 608 may send signaling 630 related to any new target frequencies in the new redirection request that are included in the BLF to the redirection component 606.

At the redirection component 606, the UE may refrain from initiating a new redirection procedure to any of one or more new target frequencies of the second RAT that are determined to be included in the one or more banned frequencies in the list.

At the redirection component 606, the UE may initiate a redirection procedure to a third RAT when all of the one or more new target frequencies are determined to be included in the one or more banned frequencies in the list by sending signaling 665 associated with the redirection procedure to the transmission component 616. The transmission component 616 may send information 690 associated with the reselection procedure to the neighbor base station 655.

At the measurement component 618, the UE may refrain from performing one or more connected mode measurements of the target frequency of the second RAT for the predetermined time period after receiving the redirection failure notification. That is the measurement component 618 can refrain from sending signaling related to a measurement request to the transmission component 616. Alternatively, the measurement component 618 may send signal 645 related to a measurement request after the predetermined time period.

The apparatus may include additional components that perform each of the blocks of the algorithm in the aforementioned flowcharts of FIGS. 5A and 5B. As such, each block in the aforementioned flowcharts of FIGS. 5A and 5B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
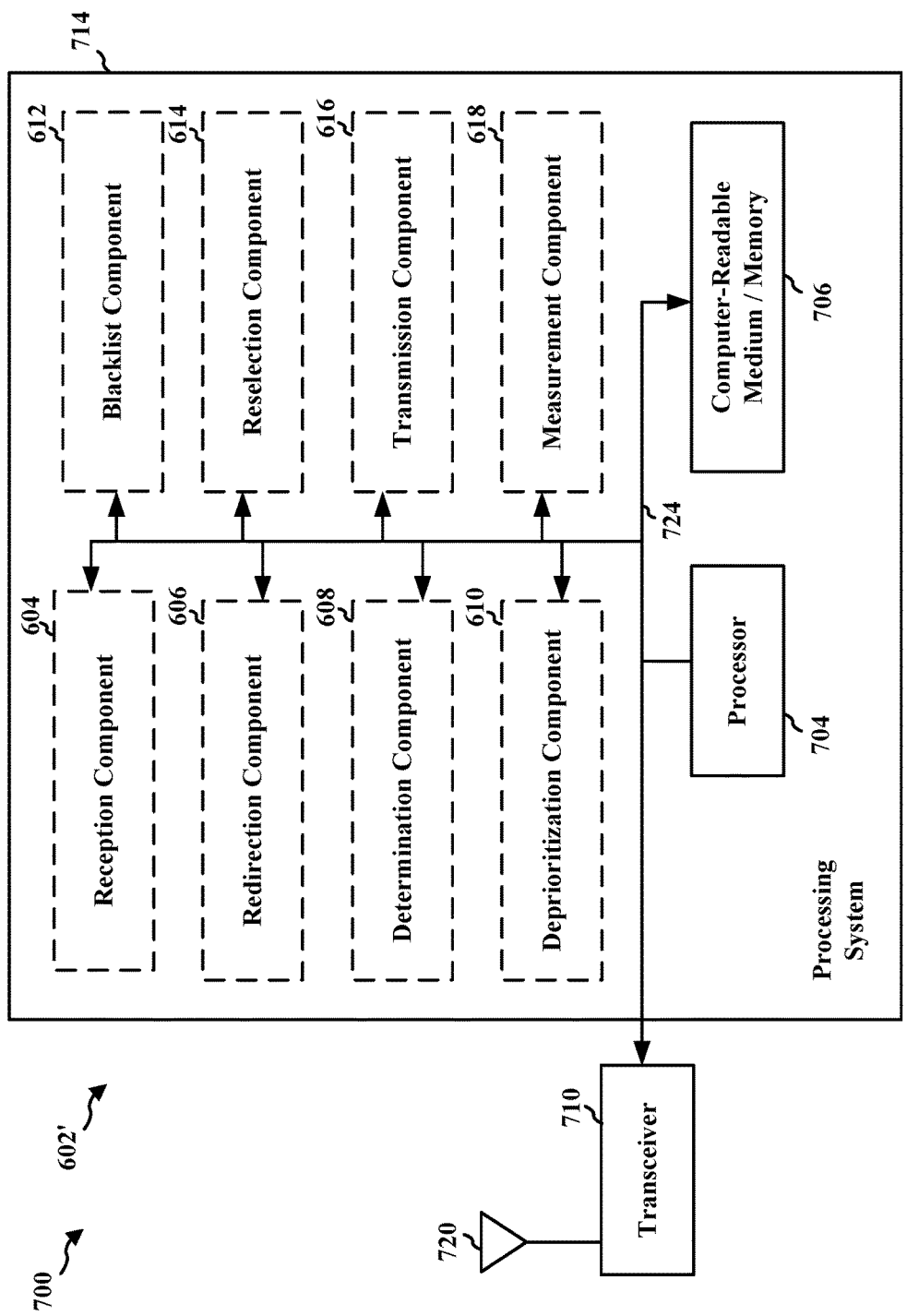
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 608, 610, 612, 614, 616, 618, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 616, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 608, 610, 612, 614, 616, 618. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication includes means for attempting to perform a redirection procedure from a first RAT to a target frequency of a second RAT. In another configuration, the apparatus 602/602' for wireless communication includes means for receiving a redirection failure notification that indicates that the target frequency of the second RAT is unavailable. In a further configuration, the apparatus 602/602' for wireless communication includes means for refraining from initiating a reselection procedure to the target frequency of the second RAT for a predetermined time period after receiving the redirection failure notification. In still a further configuration, the apparatus 602/602' for wireless communication includes means for attempting to perform the redirection procedure from the first RAT to a different target frequency of the second RAT after receiving the redirection failure notification. In an aspect, the redirection failure notification may be received via RRC layer 3 signaling from the second RAT. In still a further aspect, the apparatus 602/602' for wireless communication includes means for determining if the target frequency of the second RAT that is indicated as unavailable is present in a SIB received from a neighbor cell. Still in another configuration, the apparatus 602/602' for wireless communication includes means for deprioritizing the target frequency of the second RAT for the predetermined time period when it is determined that the target frequency of the second RAT that is indicated as unavailable is present is in the SIB received from the neighbor cell. Further still, the apparatus 602/602' for wireless communication includes means for generating a list of one or more banned frequencies that includes the target frequency of the second RAT when it is determined that the target frequency of the second RAT is indicated as unavailable. Furthermore, the apparatus 602/602' for wireless communication includes means for receiving a request to redirect from the first RAT to one or more new target frequencies of the second RAT. In yet a further configuration, the apparatus 602/602' for wireless communication includes means for determining if any of the one or more new target frequencies of the second RAT is included in the one or more banned frequencies in the list. In another configuration, the apparatus 602/602' for wireless communication includes means for refraining from initiating a new redirection procedure to any of one or more new target frequencies of the second RAT that are determined to be included in the one or more banned frequencies in the list. Furthermore, the apparatus 602/602' for wireless communication includes means for initiating a redirection procedure to a third RAT when all of the one or more new target frequencies are determined to be included in the one or more banned frequencies in the list. In an aspect, the first RAT and the second RAT may be a same RAT. In an aspect, the first RAT and the second RAT are different. In yet another aspect, the second RAT and the third RAT may be a different RAT. In a further aspect, the redirection procedure may be a connected mode procedure. Further, in another aspect, the reselection procedure may be an idle mode procedure. Furthermore, in an aspect, the redirection failure notification may be received when the target frequency of the second RAT is barred or when a timing advance of the target frequency of the second RAT is forbidden. In a further configuration, may be includes means for refraining from performing one or more connected mode measurements of the target frequency of the second RAT for the predetermined time period after receiving the redirection failure notification. The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
attempting to perform a redirection procedure from a first radio access technology (RAT) to a target frequency of a second RAT;
receiving a redirection failure notification that indicates that the target frequency of the second RAT is unavailable;
refraining from initiating a reselection procedure to the target frequency of the second RAT for a predetermined time period after receiving the redirection failure notification; and
deprioritizing the target frequency of the second RAT for the predetermined time period when the target frequency of the second RAT is indicated as unavailable and is present in a system information block (SIB) received from a neighbor cell.

2. The method of claim 1, further comprising attempting to perform the redirection procedure from the first RAT to a different target frequency of the second RAT after receiving the redirection failure notification.

3. The method of claim 1, further comprising determining if the target frequency of the second RAT that is indicated as unavailable is present in the SIB received from the neighbor cell.

4. The method of claim 1, wherein the first RAT and the second RAT are a same RAT.

5. The method of claim 1, wherein the first RAT and the second RAT are different.

6. The method of claim 5, wherein the second RAT and a third RAT are different.

7. The method of claim 1, wherein:
the redirection procedure is a connected mode procedure; and
the reselection procedure is an idle mode procedure.

8. The method of claim 1, wherein the redirection failure notification is received when the target frequency of the second RAT is barred or when a timing advance of the target frequency of the second RAT is forbidden.

9. The method of claim 1, further comprising refraining from performing one or more connected mode measurements of the target frequency of the second RAT for the predetermined time period after receiving the redirection failure notification.

10. A method of wireless communication, comprising:
attempting to perform a redirection procedure from a first radio access technology (RAT) to a target frequency of a second RAT;
receiving a redirection failure notification that indicates that the target frequency of the second RAT is unavailable;
refraining from initiating a reselection procedure to the target frequency of the second RAT for a predetermined time period after receiving the redirection failure notification; and
generating a list of one or more banned frequencies that includes the target frequency of the second RAT when the target frequency of the second RAT is indicated as unavailable.

11. The method of claim 10, further comprising attempting to perform the redirection procedure from the first RAT to a different target frequency of the second RAT after receiving the redirection failure notification.

12. The method of claim 10, further comprising determining if the target frequency of the second RAT that is indicated as unavailable is present in a system information block (SIB) received from a neighbor cell.

13. The method of claim 10, further comprising receiving a request to redirect from the first RAT to one or more new target frequencies of the second RAT.

14. The method of claim 13, further comprising determining if any of the one or more new target frequencies of the second RAT is included in the one or more banned frequencies in the list.

15. The method of claim 14, further comprising refraining from initiating a new redirection procedure to any of one or more new target frequencies of the second RAT that are determined to be included in the one or more banned frequencies in the list.

16. The method of claim 15, further comprising initiating a redirection procedure to a third RAT when all of the one or more new target frequencies are determined to be included in the one or more banned frequencies in the list.

17. The method of claim 10, wherein the first RAT and the second RAT are a same RAT.

18. The method of claim 10, wherein the first RAT and the second RAT are different.

19. The method of claim 16, wherein the second RAT and the third RAT are different.

20. The method of claim 10, wherein:
the redirection procedure is a connected mode procedure;
the reselection procedure is an idle mode procedure.

21. The method of claim 10, wherein the redirection failure notification is received when the target frequency of the second RAT is barred or when a timing advance of the target frequency of the second RAT is forbidden.

22. The method of claim 10, further comprising refraining from performing one or more connected mode measurements of the target frequency of the second RAT for the predetermined time period after receiving the redirection failure notification.

23. An apparatus for wireless communication, comprising:
a memory; and
at least one processor coupled to the memory and configured to:
attempt to perform a redirection procedure from a first radio access technology (RAT) to a target frequency of a second RAT;
receive a redirection failure notification that indicates that the target frequency of the second RAT is unavailable;
refrain from initiating a reselection procedure to the target frequency of the second RAT for a predetermined time period after receiving the redirection failure notification; and
deprioritize the target frequency of the second RAT for the predetermined time period when the target frequency of the second RAT is indicated as unavailable and is present in a system information block (SIB) received from a neighbor cell.

24. The apparatus of claim 23, wherein the at least one processor is further configured to determine if the target frequency of the second RAT that is indicated as unavailable is present in the SIB received from the neighbor cell.

25. The apparatus of claim 23, wherein the at least one processor is further configured to refrain from performing one or more connected mode measurements of the target frequency of the second RAT for the predetermined time period after receiving the redirection failure notification.

26. An apparatus for wireless communication, comprising:
- a memory; and
- at least one processor coupled to the memory and configured to:
  - attempt to perform a redirection procedure from a first radio access technology (RAT) to a target frequency of a second RAT;
  - receive a redirection failure notification that indicates that the target frequency of the second RAT is unavailable;
  - refrain from initiating a reselection procedure to the target frequency of the second RAT for a predetermined time period after receiving the redirection failure notification; and
  - generate a list of one or more banned frequencies that includes the target frequency of the second RAT when the target frequency of the second RAT is indicated as unavailable.

27. The apparatus of claim 26, wherein the at least one processor is further configured to:
- receive a request to redirect from the first RAT to one or more new target frequencies of the second RAT;
- determine if any of the one or more new target frequencies of the second RAT is included in the one or more banned frequencies in the list;
- refrain from initiating a new redirection procedure to any of one or more new target frequencies of the second RAT that are determined to be included in the one or more banned frequencies in the list; and
- initiate a redirection procedure to a third RAT when all of the one or more new target frequencies are determined to be included in the one or more banned frequencies in the list.

28. The apparatus of claim 26, wherein the at least one processor is further configured to refrain from performing one or more connected mode measurements of the target frequency of the second RAT for the predetermined time period after receiving the redirection failure notification.

* * * * *